(No Model.)
J. CORCORAN.
SELF ADJUSTING TROLLEY.
No. 532,031. Patented Jan. 8, 1895.
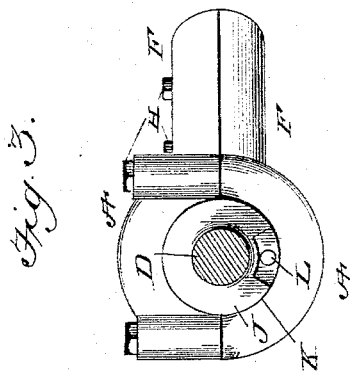
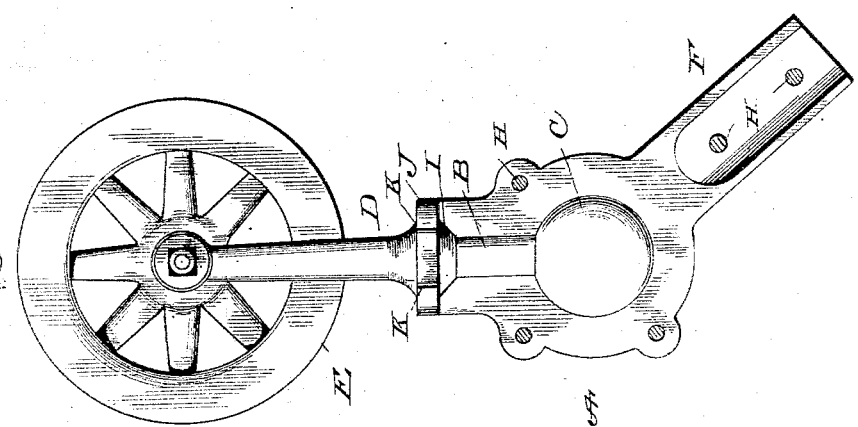
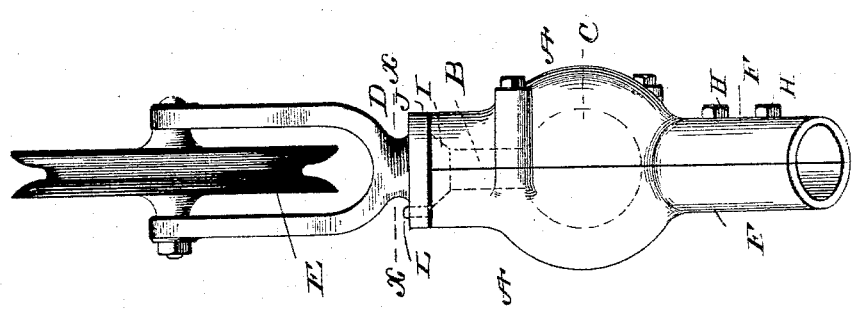
Witnesses
John O'Quinie
Thos. E. Robertson
Inventor
John Corcoran
By T. J. W. Robertson
Attorney

UNITED STATES PATENT OFFICE.

JOHN CORCORAN, OF HARRISBURG, PENNSYLVANIA, ASSIGNOR OF ONE-HALF TO ALFRED T. BLACK, OF SAME PLACE.

SELF-ADJUSTING TROLLEY.

SPECIFICATION forming part of Letters Patent No. 532,031, dated January 8, 1895.

Application filed August 29, 1894. Serial No. 521,624. (No model.)

*To all whom it may concern:*

Be it known that I, JOHN CORCORAN, a citizen of the United States, residing at Harrisburg, Dauphin county, Pennsylvania, have invented certain new and useful Improvements in Self-Adjusting Trolleys, of which the following is a specification, reference being had therein to the accompanying drawings.

This improvement relates to that class of trolleys in which the wheel is set in a standard so arranged that said standard will turn on its axis to allow the trolley wheel to accommodate itself to the electrical conductor in turning curves.

The object of this improvement is to provide a cheaply made and simple trolley of this class, which, while it will readily accommodate itself to any of the curves of the conductor, will not be likely to get out of order or to turn so much as to be objectionable.

To these ends the invention consists in the peculiar construction and combinations of parts hereinafter more particularly described and then definitely claimed.

In the accompanying drawings—Figure 1 is a front view of a trolley constructed according to my improvement. Fig. 2 is a side view with one-half of the holder removed. Fig. 3 is a section through the line $x\ x$.

Referring now to the details of the drawings by letters—A A indicate two shells or castings which are hollowed out to receive the shank B and ball C of the standard D, in the fork of which runs the trolley wheel E. Extending from the lower part of said shells A are the ears F, which are made concave so that when the two ears are brought together they form a socket to receive the top of the trolley rod.

At H are shown screws or bolts by which the two parts are held together and to the trolley rod.

At the upper part of the shank is a tapering collar I, which fits into a corresponding recess in the top of the holder, and above this is a flat collar J resting on the top of the holder, which collar is cut away for a part of its circumference, leaving corners at each end of the cut-away portion, thus forming stops K when they come in contact with a projection or pin L set in or formed on the top of one side of the holder, and thus the amount of motion of the holder is limited to the desired degree.

By this construction a very convenient trolley is provided—one which will readily follow the conductor no matter how small the radius of its curves, and yet not be likely to turn too much, as would be the case were there no means to prevent its turning beyond the desired extent.

What I claim as new is—

1. The combination with the two shells A, having recesses to receive the standard, of a standard D fitting the recesses in the shells, and provided with a collar J having stops formed thereon, and a pin L on one of the shells and between said stops, substantially as described.

2. The trolley top herein described, comprising the shells A, having hollow ears F, the standard D, carrying the wheel E, and having shank B, ball C, and stop collar J, the pin L and screws H, all substantially as described and shown.

In testimony whereof I affix my signature, in presence of two witnesses, this 28th day of August, 1894.

JOHN CORCORAN.

Witnesses:
J. M. SMALL,
FREDERICK M. OTT.